Patented Oct. 10, 1950

2,525,753

UNITED STATES PATENT OFFICE 2,525,753

GELATIN DERIVATIVES

Henry C. Yutzy and Gordon F. Frame, Rochester, N. Y., assignors to Eastman Kodak Company, Rochester, N. Y., a corporation of New Jersey No Drawing. Application August 13, 1947, Serial No. 768,474

6 Claims. (Cl. 260—117)

This invention relates to derivatives of gelatin having distinctive properties prepared by reacting gelatin with one or more of the following anhydrides: phthalic, maleic, succinic, their halogen and sulfo-substituted derivatives.

Gelatin has been known for several decades, and this material has been found to have many and varied applications making use of either its solubility characteristics, its possession of an isoelectric point or its water-swelling characteristics. Gelatins vary as to the degree to which they are susceptible to the action of water, depending among other things on their purity, the method by which they were prepared, and their chemical makeup. It has been sometimes found desirable to alter the characteristics of gelatin by treatments, some of which are chemical in nature.

One object of our invention is to prepare derivatives of gelatin. Another object of our invention is to prepare gelatin compounds having new and different characteristics than either of the compounds employed in their preparation. A further object of our invention is to prepare derivatives of gelatin which are resistant to the hardening action of formaldehyde. A still further object of our invention is to prepare new compounds from gelatin and certain dicarboxylic acid anhydrides. Other objects will appear herein.

We have found that the reaction products of gelatin and phthalic, succinic, maleic, and the halogen or sulfo-substituted anhydrides corresponding thereto exhibit unique characteristics differing from those of previously known gelatin compounds. We have found that these compounds especially differ from modified gelatins previously prepared in their various viscosities, in the change of viscosity with change of pH, in their swelling characteristics, in their susceptibility to hardening agents, and in the flocculation of silver bromide sols.

The products of our invention are prepared by heating an aqueous dispersion of gelatin with a solution of phthalic anhydride (or maleic, succinic, or halogen- or sulfo-substituted anhydride) at an alkaline pH. The reaction was found to proceed most satisfactorily at a pH of 10–11 and at a temperature within the range of 30–50° C. However, the reaction may be conducted at any alkaline pH (between 7 and 12) and at a temperature (in the range in which it is convenient to work with gelatin in solutions—such as 35°–70° C.), but the time should be very short if temperatures above 40° C. are employed to avoid breakdown of the gelatin. It is desirable during the course of the reaction to add alkali from time to time (or, if desired, continuously) to maintain a fairly constant pH. After the reaction has been completed (sometimes as little as one-half hour) it is desirable in recovering the gelatin compound to add acid to neutrality, set the mass by cooling, and wash free from salts, etc. with cool water. However, drying may be direct without any washing operation.

The gelatin derivatives of our invention are characterized by their resistance to hardening by formaldehyde in contrast to the characteristics of gelatin and previously known gelatin derivatives on this score. Also, these gelatin derivatives resist chrom alum hardening to a much greater extent than do gelatins and previously known gelatin derivatives. The gelatin compounds of our invention also differ from either one or both of gelatin and gelatin derivatives previously known in their susceptibility to dyes, in their swelling properties, and in their viscosity characteristics.

The gelatin derivatives of our invention are generally useful in capacities in which gelatin has previously been used but with the difference that many differing properties are found. These gelatin derivatives may be employed in lithographic printing processes, for preparing silver halide dispersions, as a vehicle for the silver halide in photographic emulsions, or in imbibition processes in photography. These gelatin derivatives are especially useful as peptizing agents in preparing silver halides in dispersed form as the flocculation of the silver halide is at a minimum when these gelatin derivatives are employed. Our invention includes the products resulting from reacting gelatin with either phthalic, succinic or maleic anhydrides or with halogen- or sulfo-substituted derivatives thereof such as chloro-maleic, bromo-phthalic, sulfo-phthalic and sulfo-succinic anhydrides, in the manner described herein.

The following examples illustrate the preparation of products in accordance with our invention:

*Example 1.*—100 parts of gelatin were dispersed in 1000 parts of water at 40° C. While stirring, aqueous 10% sodium hydroxide solution was added to the dispersion until a pH of 10 was obtained. A solution of 7 parts of phthalic anhydride, when dissolved in 50 parts of dry acetone, was slowly added to the dispersion over a period of about fifteen minutes, the pH being kept at approximately 10 by additions of sodium hydroxide solution from time to time. After the addition of the anhydride solution, the dispersion was stirred for ten minutes at a pH of 10. Dilute sulfuric acid was then added to bring the pH down to 7. The dispersion was set to a gel by chilling, was shredded into noodles, washed and dried.

*Example 2.*—The above procedure was repeated except that the phthalic anhydride was added in finely powdered form instead of in the form of its solution in acetone. Otherwise, the procedure employed was the same. If desired in the above examples, the washing operation may be omitted and the gel may be dried immediately following the reaction.

*Example 3.*—50 parts of gelatin were dispersed in 500 parts of distilled water at 50° C. and cooled to 40° C. The pH was raised to 9.5 by the addition of 10% sodium hydroxide solution. The mass was vigorously stirred and while agitating, a solution of 5 parts of succinic anhydride in 50 parts of dry acetone was added over a period of thirty minutes, the pH being maintained at 9.5 by the addition of sodium hydroxide solution from time to time. After the addition of the anhydride solution, the gelatine dispersion was stirred for forty minutes at 40° C. Dilute sulfuric acid was added to bring the pH to 7. The dispersion was then chilled, setting it to a gel, which gel was shredded into noodles and washed with cool water.

*Example 4.*—100 parts of gelatin were dispersed in 1000 parts of distilled water at 50° C. After cooling to 40° C. the pH of the dispersion was adjusted to 10 by the addition of 10% sodium hydroxide solution. A solution of 9 parts of maleic anhydride in 50 parts of dry acetone was gradually added over a period of twenty minutes while stirring vigorously. Care was taken to maintain the pH at 10 by the careful addition of 10% sodium hydroxide from time to time. After the addition of the anhydride solution, the solution was stirred for fifteen minutes at 40° C. to complete the reaction. Dilute sulfuric acid was then added to bring the pH to 7, and the gelatin derivative was chilled. After shredding into noodles, the dispersion was washed in cold water.

*Example 5.*—100 parts of gelatin were dispersed in 750 parts of distilled water at 50° C. After cooling to 40° C., 10% sodium hydroxide solution was added to bring the pH to 10. While stirring vigorously a solution of 12 parts of chloro-maleic anhydride in 50 parts of dry acetone was gradually added over a period of fifteen minutes. The pH was maintained at 10 by the careful addition of 10% sodium hydroxide solution from time to time. After the anhydride addition, the dispersion was stirred for twenty minutes at 40° C. to complete the reaction. Dilute sulfuric acid was then used to bring the pH to 7. The gelatin derivative may be used directly, or it may be washed in chilled water after setting and shredding into noodles.

The gelatin derivatives which were prepared in accordance with the above examples were all found to be resistant to the hardening action of formaldehyde. For instance, an untreated gelatin has a melting point of approximately 33° C. and when hardened with formaldehyde was found to have a melting point of 91–92° C. Gelatin derivatives other than described herein, such as the phthalyl chloride derivatives, also were found to be hardened by formaldehyde exhibiting melting points of 95–97° C. It was found, however, that with the derivatives prepared in accordance with the above examples that the melting point remains substantially the same after treatment with formaldehyde as prior to that treatment, thus showing that the formaldehyde had little or no effect upon those gelatin derivatives. Also, these gelatin compounds are much more resistant to the hardening action of chrom alum. For instance, whereas with gelatin the melting point is increased to 55° C. and with other gelatin derivatives to 68–70° C., the melting point of gelatin derivatives as prepared in accordance with the above examples increased only to about 45° C. The gelatin derivatives prepared in accordance with the above examples also exhibit viscosity properties pronouncedly different from those of the viscosity properties of gelatin derivatives which have been previously prepared. For instance, the change of viscosity with the change of pH from the iso-electric point to 1 pH above that point is very gradual as compared with previously known derivatives of gelatin. Also the intrinsic viscosities of these gelatin derivatives are very similar to those of gelatins rather than those of other types of gelatin derivatives which have been prepared. The degree of flocculation of an aqueous silver halide sol at the point of minimum peptization is considerably less with the gelatin derivatives of our invention than that with gelatin and some other gelatin derivatives. For example, when a dilute aqueous gelatin solution is slowly added to an aqueous silver bromide sol and the turbidity of the resulting suspension is determined as a measure of the degree of peptization of the sol, very low concentrations of added gelatin cause peptization which decreases with increasing concentration up to a point of minimum peptization, followed by increase in efficiency of peptization with increasing concentration. With normal gelatins and many gelatin derivatives, the degree of flocculation at the minimum is very great whereas with the gelatin derivatives described herein, the degree of flocculation at this point is low.

Therefore, the gelatin derivatives of our invention are particularly useful for preparing silver-halide photographic emulsions. The use of these derivatives for preparing silver-halide dispersions is described and claimed in our application Serial No. 768,475 filed of even date. Not only are these gelatin derivatives useful as protective colloids for silver halides but also their properties are such that they are inert to the photographic chemicals which are employed in developing and fixing those emulsions.

It is to be understood that degraded gelatin or glue may be used as the starting material in preparing gelatin derivatives as described herein if desired. It is preferred, however, to employ gelatins which are undegraded or capable of setting.

We claim:

1. The method of preparing a gelatin derivative which comprises reacting gelatin with a dicarboxylic acid anhydride selected from the group consisting of phthalic, succinic, maleic and the chloro-, bromo- and sulfo-substituted anhydrides corresponding thereto in an aqueous system in which the pH is maintained at between 7 and 12 at a temperature of 30–70° C. for a non-degrading time of not more than forty minutes after the anhydride has been completely added.

2. The method of preparing a gelatin derivative which comprises reacting gelatin with phthalic anhydride in an aqueous system in which the pH is maintained at between 7 and 12 at a temperature of 30.50° C. for a non-degrading time of not more than forty minutes after the anhydride has been completely added.

3. The method of preparing a gelatin derivative which comprises adding to an aqueous solution of gelatin, phthalic anhydride over a period of fifteen minutes at a pH of 10 and a temperature of 40° C. and maintaining at that pH while agitating the mass for approximately ten minutes.

4. The method of preparing a gelatin derivative which comprises reacting gelatin with succinic anhydride in an aqueous system in which the pH is maintained at between 7 and 12 at a temperature of 30-50° C. for a non-degrading time of not more than forty minutes after the anhydride has been completely added.

5. The method of preparing a gelatin derivative which comprises reacting gelatin with maleic anhydride in an aqueous system in which the pH is maintained at between 7 and 12 at a temperature of 30-50° C. for a non-degrading time of not more than forty minutes after the anhydride has been completely added.

6. The method of preparing a gelatin derivative which comprises reacting gelatin with chloromaleic anhydride in an aqueous system in which the pH is maintained at between 7 and 12 at a temperature of 30-50° C. for a non-degrading time of not more than forty minutes after the anhydride has been completely added.

HENRY C. YUTZY.
GORDON F. FRAME.

REFERENCES CITED

The following references are of record in the file of this patent:

UNITED STATES PATENTS

| Number | Name | Date |
| --- | --- | --- |
| 2,240,476 | Simmons et al. | Apr. 29, 1941 |
| 2,402,542 | Foote et al. | June 25, 1946 |

FOREIGN PATENTS

| Number | Country | Date |
| --- | --- | --- |
| 831,630 | France | June 13, 1938 |
| 537,256 | Great Britain | June 16, 1941 |

OTHER REFERENCES

Olcott, Ind. and Eng. Chem. (January, 1946), vol. 38, pp. 104 to 106.